(12) United States Patent
Perrin

(10) Patent No.: US 12,095,717 B1
(45) Date of Patent: Sep. 17, 2024

(54) AUTOMATED INCOMING EMAIL DELIVERY FILTER SYSTEM AND PROCESS

(71) Applicant: Hunter Kent Perrin, San Marcos, CA (US)

(72) Inventor: Hunter Kent Perrin, San Marcos, CA (US)

(*) Notice: Subject to any disclaimer, the term of this patent is extended or adjusted under 35 U.S.C. 154(b) by 0 days.

(21) Appl. No.: 18/115,515

(22) Filed: Feb. 28, 2023

Related U.S. Application Data

(60) Provisional application No. 63/314,964, filed on Feb. 28, 2022.

(51) Int. Cl.
*H04L 51/212* (2022.01)
*H04L 51/42* (2022.01)

(52) U.S. Cl.
CPC ............ *H04L 51/212* (2022.05); *H04L 51/42* (2022.05)

(58) Field of Classification Search
CPC ... H04L 51/212; H04L 51/42; H04L 65/1076; H04L 51/04; H04L 51/48; H04L 51/214
USPC .......................................................... 709/206
See application file for complete search history.

(56) References Cited

U.S. PATENT DOCUMENTS

| | | | | |
|---|---|---|---|---|
| 7,577,709 B1* | 8/2009 | Kolcz | ............... | G06F 18/24155 706/20 |
| 8,028,031 B2* | 9/2011 | Colvin | ................... | H04L 51/212 709/206 |
| 8,082,306 B2* | 12/2011 | Maresh | ................ | G06Q 10/107 709/205 |
| 9,177,293 B1* | 11/2015 | Gagnon | ................ | H04L 51/212 |
| 9,237,121 B1* | 1/2016 | Graham | ................ | H04L 51/212 |
| 11,483,270 B2* | 10/2022 | Freed | .................... | G06Q 10/107 |
| 2004/0249895 A1* | 12/2004 | Way | ........................ | H04L 63/08 709/206 |
| 2005/0114516 A1* | 5/2005 | Smith | .................. | G06Q 10/107 709/227 |
| 2006/0036690 A1* | 2/2006 | O'Neil | .................. | H04L 51/212 709/206 |
| 2006/0047766 A1* | 3/2006 | Spadea | ................. | H04L 51/212 709/206 |
| 2006/0168017 A1* | 7/2006 | Stern | ..................... | G06Q 10/107 709/206 |
| 2007/0043813 A1* | 2/2007 | Pickup | ................ | H04L 61/4511 709/206 |
| 2008/0104188 A1* | 5/2008 | Oliver | ................... | H04L 51/212 709/206 |

(Continued)

*Primary Examiner* — Sargon N Nano
(74) *Attorney, Agent, or Firm* — Plager Schack LLP; Mark H. Plager; Stephen Hallberg

(57) ABSTRACT

A system and process for receiving email that blocks messages from unwanted automated senders are disclosed. The system is configured to filter automated email from automated senders by way of multiple user-configurable recipient email addresses and corresponding challenge questions to block messages from unwanted automated senders and allow email to be received from wanted automated senders. In this way, the system allows for different recipient addresses to either receive email from automated senders or screen senders with a challenge response, thereby allowing an email user to use the same account to receive both messages from wanted automated senders and messages from human senders. Even if a desired automated sender uses multiple "From" addresses or changes their "From" address unexpectedly, their messages will still be accepted by the system.

8 Claims, 4 Drawing Sheets

(56) References Cited

U.S. PATENT DOCUMENTS

| | | | |
|---|---|---|---|
| 2008/0133680 A1* | 6/2008 | Kodama | H04L 51/212 709/206 |
| 2008/0172468 A1* | 7/2008 | Almeida | G06Q 10/107 709/206 |
| 2010/0049809 A1* | 2/2010 | Ladd | G06Q 10/107 709/206 |
| 2010/0115033 A1* | 5/2010 | Geffner | H04M 1/7243 709/206 |
| 2012/0296988 A1* | 11/2012 | Rao | G06Q 10/107 709/206 |
| 2013/0290869 A1* | 10/2013 | Mencke | G06Q 10/107 715/752 |
| 2013/0305269 A1* | 11/2013 | Verma | H04N 21/2407 725/5 |
| 2015/0256545 A1* | 9/2015 | Dotterer, III | H04L 67/10 726/1 |
| 2015/0356630 A1* | 12/2015 | Hussain | H04L 51/212 705/14.69 |
| 2016/0127277 A1* | 5/2016 | Faulkner | H04L 51/23 709/206 |
| 2016/0212079 A1* | 7/2016 | Oliver | G06Q 10/107 |
| 2017/0063919 A1* | 3/2017 | Buddepalli | H04L 63/1441 |
| 2018/0219830 A1* | 8/2018 | O'Brien | H04L 51/08 |
| 2019/0166128 A1* | 5/2019 | Kurian | H04L 63/145 |
| 2021/0058395 A1* | 2/2021 | Jakobsson | H04L 67/306 |
| 2022/0308764 A1* | 9/2022 | Pismenny | G06F 3/061 |
| 2023/0269268 A1* | 8/2023 | Stanley | H04L 67/55 709/206 |

* cited by examiner

AUTOMATED INCOMING EMAIL DELIVERY FILTER SYSTEM AND PROCESS

CLAIM OF BENEFIT TO PRIOR APPLICATION

This application claims benefit to U.S. Provisional Patent Application 63/314,964, entitled "SYSTEM AND PROCESS TO FILTER AUTOMATED EMAIL FROM AUTOMATED SENDERS BY WAY OF MULTIPLE USER-CONFIGURABLE RECIPIENT EMAIL ADDRESSES AND CORRESPONDING CHALLENGE QUESTIONS TO BLOCK MESSAGES FROM UNWANTED AUTOMATED SENDERS AND ALLOW EMAIL TO BE RECEIVED FROM WANTED AUTOMATED SENDERS," filed Feb. 28, 2022. The U.S. Provisional Patent Application 63/314,964 is incorporated herein by reference.

BACKGROUND

Embodiments of the invention described in this specification relate generally to email spam and junk mail filtering systems, and more particularly, to a system and process to filter automated email from automated senders by way of multiple user-configurable recipient email addresses and corresponding challenge questions to block messages from unwanted automated senders and allow email to be received from wanted automated senders.

Email users receive messages from unwanted automated senders (spam).

There exist systems to categorize emails based on a recipient address. There also exist systems to screen senders with a challenge response before email is allowed through for delivery. There currently exists no system that implements both of these features, allowing receipt of messages from humans and messages from only desired automated senders.

Therefore, what is needed is a way to allow for different recipient addresses to either receive email from automated senders or screen senders with a challenge response.

BRIEF DESCRIPTION

A novel automated incoming email delivery filter system configured to filter automated email from automated senders by way of multiple user-configurable recipient email addresses and corresponding challenge questions to block messages from unwanted automated senders and allow email to be received from wanted automated senders and automated incoming email delivery filter processes are disclosed. In some embodiments, the automated incoming email delivery filter system allows for different recipient addresses to either receive email from automated senders or screen senders with a challenge response. In this way, the automated incoming email delivery filter system allows an email user to use the same account to receive both messages from wanted automated senders and messages from human senders. Even if a desired automated sender uses multiple "From" addresses or changes their "From" address unexpectedly, their messages will still be accepted by the automated incoming email delivery filter system.

In some embodiments, the email user is enabled to create any number of recipient email addresses and able to create new recipient email addresses at different times. In some embodiments, email delivery settings are specified for each of the recipient email addresses associated with the email user. In some embodiments, the email user configures the email delivery settings for each recipient email address to allow all senders or screen and challenge senders.

In some embodiments, the automated incoming email delivery filter system allows for different recipient addresses to handle incoming email from automated senders. In some embodiments, the automated incoming email delivery filter system comprises a command architecture that is configured to (i) review account settings and permissions associated with a plurality of recipient email addresses associated with a user and (ii) handle delivery of an incoming email that is addressed to a particular recipient email address in the plurality of recipient email addresses based on the account settings and permissions. In some embodiments, the account settings and permissions specify at least one of (i) unobstructed delivery of incoming email to a recipient email address in which the settings for the recipient email address are configured to allow delivery of email from all senders including automated senders, (ii) screened delivery of incoming email from an approved sender email address to a recipient email address in which the settings for the recipient email address include the sender email address in a list of approved senders (based on user configured approval, successful completion of a challenge, etc.), (iii) screened and challenge-pending delivery of incoming email from a non-approved sender email address to a recipient email address in which the list of approved senders in the settings for the recipient email address does not include the non-approved sender email address until the non-approved sender responds to and passes a challenge, and (iv) blocked delivery of the incoming email from the non-approved sender email address when the non-approved sender (a) does not respond to the challenge or (b) responds to but does not pass the challenge.

In some other embodiments, the multiple recipient email addresses are not user-configurable and the email user is not allowed to specify the email delivery settings for each recipient email address. In some embodiments, an automated process configures email delivery settings for each of the recipient email addresses. In some embodiments, the automated process comprises a software-implemented automated program of a host service provider in which the email user has an account. In some embodiments, the host service provider can implement a scheme to determine whether any given recipient email address created by the email user should have email delivery settings configured to allow automated senders or not. In some embodiments, the implemented scheme configures the email delivery settings for a recipient email address when the email user creates the recipient email address and the determination of whether the newly created recipient email address should receive emails from automated senders is made automatically by the host service provider based on one of several available email delivery setting scheme outlines. In some embodiments, instead of the email user creating the recipient email addresses, the host service provider automatically provides the multiple recipient email addresses to the email user. In some embodiments, the automatically provided multiple recipient email addresses are capped to a maximum number of recipient email addresses by the host service provider.

In some embodiments, the automated incoming email delivery filter processes comprise (i) an automated incoming email delivery filter account settings and permissions setup process and (ii) an automated incoming email delivery filter process for determining incoming email delivery handling according to user-configured account settings and permissions.

In some embodiments, the automated incoming email delivery filter account settings and permissions setup process comprises setting up an account, by a user, where the user is allowed to set up and configure multiple email addresses or the account of the user is automatically allocated a plurality of email addresses by a service provider. In some embodiments, the automated incoming email delivery filter account settings and permissions setup process also enables the user to (optionally) create groups of email addresses from various combinations of email addresses among the multiple email addresses configured by the user or allocated by the service provider. Furthermore, the automated incoming email delivery filter account settings and permissions setup process includes a step at which the user may indicate, for each individual email address or group of addresses, whether email from senders, including automated senders, should be delivered (without obstruction), screened for contingent pending delivery to the address or group, or blocked from delivery to the address or group.

In some embodiments, the automated incoming email delivery filter process for determining incoming email delivery handling according to user-configured account settings and permissions is a process that occurs after the user has set up an account and is associated with multiple email addresses (also referred to as "recipient addresses"), where each recipient address has been further configured to indicate whether to block or allow email from automated senders. Thus, the automated incoming email delivery filter process performs a plurality of steps comprising (i) receiving an incoming email addressed to a particular email address among the multiple email addresses configured by or allocated to the user, (ii) determining, upon receipt of the incoming email, whether the particular email address is configured to allow delivery of incoming email sent by automated senders, (iii) delivering the email to the user when the recipient address of the email is configured with settings to allow incoming email from automated senders, (iv) responding to the email with a sender address approval challenge (also referred to simply as the "challenge") when the recipient address is configured to screen or block incoming email from automated senders, (v) awaiting a challenge response in the form of an action of the sender connected to the challenge or a reply email from the sender in response to the challenge (or any other means, not necessarily by email or action), (vi) determining whether the sender successfully completed the challenge response, and (vii) allowing the incoming email to proceed to the user when the sender has successfully completed the challenge response.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
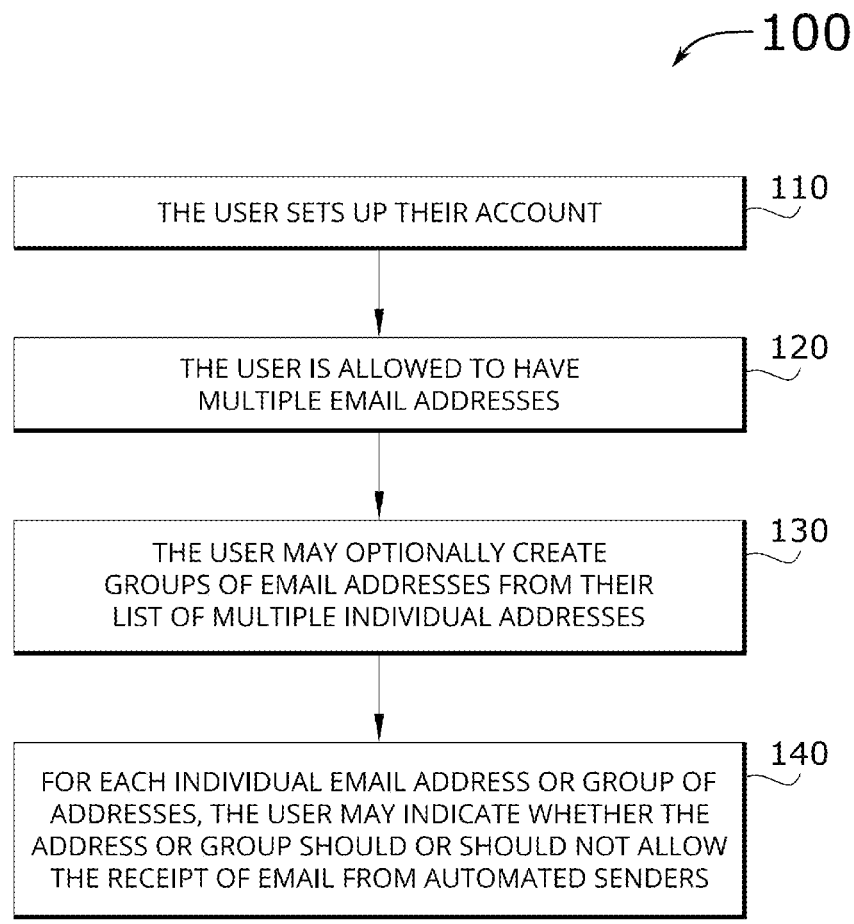
FIG. 1 conceptually illustrates an automated incoming email delivery filter account settings and permissions setup process in some embodiments.

In the following detailed description of the invention, numerous details of the configuration and settings involved in using the automated incoming email delivery filter system and process are described. Without departing from the scope and spirit of the invention, the overall automated incoming email delivery filter system is a solution that can be implemented in and deployed for different types of email systems or other systems and which supports modifications by hosts or providers in accordance with possible unique requirements they may have. Therefore, it will be clear to one skilled in the art that the invention is not limited to the embodiments set forth and that the invention can be adapted in any of several ways, not just those ways which are used exclusively in connection with email filtering, but applicable to other filtering where a person or user configures multiple addresses, links, or other notation for communication. Also, all standards specified in this disclosure are intended to be exemplary only and are not intended to be limiting, per se. Instead, the embodiments described in this specification intend to cover expected and anticipated improvements in email, text, data filtering, etc., when applied in connection with other systems, such as (without limitation) challenge systems, authentication systems, machine learning systems, artificial intelligence systems, data communication and transmission systems, data management systems, etc. Thus, any updates or improvements to such email, text processing, data processing, authentication and challenge issuing and providing systems, and/or filtering technology and processing systems is considered to be inclusive in the description set forth in this specification. Furthermore, the relational connections shown in the Figures are not necessarily fully encompassing of all elements or steps that may be present in a detailed view of the same. For instance, a command architecture of an exemplary automated incoming email delivery filter system is demonstrated by way of simple iconography and direction arrows which are instructive, but not limiting. Furthermore, many of the embedded, implied, and/or background steps, commands, processes, elements, etc., are not illustrated in specific placements with respect to other elements, steps, commands, etc., but are described here in a manner in which a person of ordinary skill in the art would be able to comprehend. Other relational connections are demonstrated between human users, software-based systems (such as an email service), and/or hardware computer systems (whether virtual, bare metal, or hybrid systems, modules, processing units, and the like) and are therefore understood to conceptually illustrate relationships between different components in a general way such that a person of ordinary skill could envision that the automated incoming email delivery filter system could be deployed as a local system or an Internet-based system, such as by a cloud application service hosted on a cloud server, where the automated incoming email delivery filter system is accessed by human users operating computing devices and over network connections (Internet), with other systems, sub-systems, modules, etc., being communicably connected to the automated incoming email delivery filter system. For instance, an email screening manager module running on the server of the automated incoming email delivery filter system with an optional machine learning (ML) system running as a backend cloud application service (not necessarily accessible to human users) that is available for other processing needs of the automated incoming email delivery filter system, such as artificial intelligence (AI) processing sub-systems, etc. While these relationships are often demonstrated in the figures as one-to-one relationships, a person of ordinary skill in the art would appreciate that many other relational connections are possible, and therefore, are not considered limiting (e.g., connected components may be connected in a more detailed manner, such as by other hardware components, e.g., communication towers, wireless gateway devices, firewall appliances, routers, etc.). As will be understood by those of ordinary skill in the relevant art, the actual elements, steps, and relationships between them, for any system, any device, combinations of a system and devices, or any part of a system or device disclosed in this specification will be determined by its intended use.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment", "an embodiment", or "some embodiments" is intended to indicate that a particular feature, structure, or characteristic described in connection with the embodiment or embodiments is included in at least one embodiment, and possibly multiple embodiments, of the invention. The appearances of the phrases "one embodiment", "an embodiment", or "some embodiments" in various places in the specification are not necessarily all referring to the same embodiment.

As used in this disclosure, except where the context requires otherwise, the term "comprise" and variations of the term, such as "comprising", "comprises", and "comprised" are not intended to exclude other components, elements, items, steps, actions, interactions, or any other evident or implied items.

Also, it is noted that process and method embodiments may be described as a process, each process, sub-process, or steps of process being depicted as a flowchart, a flow diagram, a structure diagram, or a block diagram. The flowcharts and block diagrams in the figures can illustrate the architecture, functionality, and operation of possible implementations of systems, methods and computer programs of the disclosed automated incoming email delivery filter system and processes. In this regard, each block in the flowcharts or block diagrams can represent a module, segment, or portion of code, that can comprise one or more executable instructions for implementing the specified logical function(s). It should also be noted that, in some alternative implementations, the functions noted in the blocks may occur out of the order noted in the figures. Although a flowchart may describe the operations as a sequential process, many of the operations can be performed in parallel or concurrently. In addition, the order of the operations may be rearranged. A process may be terminated when its operations are completed, but in some cases, the process is designed to continue running until shutdown or otherwise stopped (e.g., looping back to the start of the process or to an earlier step in the process and then continuing forward). Also, a process may correspond to a method, a function, a procedure, a subroutine, a subprogram, etc. When a process corresponds to a function, its termination corresponds to a return of the function to the calling function or the main function. For instance, the automated incoming email delivery filter process may capture each incoming email separately to process within function logic, and the function for doing so could be called concurrently multiple times by the automated incoming email delivery filter system when incoming email traffic is sufficiently high. Additionally, each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a storage may represent one or more devices for storing data, including read-only memory (ROM), random access memory (RAM), magnetic disk storage mediums, optical storage mediums, flash memory devices and/or other non-transitory machine readable mediums for storing information. The term "machine readable medium" includes, but is not limited to portable or fixed storage devices, optical storage devices, wireless channels and various other non-transitory mediums capable of storing, comprising, containing, executing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc. and are also referred to as an interface, where the interface is the point of interaction with software, or computer hardware, or with peripheral devices.

Some embodiments provide an automated incoming email delivery filter system and process. In some embodiments, the automated incoming email delivery filter system is configured to filter automated email from automated senders by way of multiple user-configurable recipient email addresses and corresponding challenge questions to block messages from unwanted automated senders and allow email to be received from wanted automated senders. In some embodiments, the automated incoming email delivery filter system allows for different recipient addresses to either receive email from automated senders or screen senders with a challenge response. In this way, the automated incoming email delivery filter system allows an email user to use the same account to receive both messages from wanted automated senders and messages from human senders. Even if a desired automated sender uses multiple "From" addresses or changes their "From" address unexpectedly, their messages will still be accepted by the automated incoming email delivery filter system.

In some embodiments, the email user is enabled to create any number of recipient email addresses and able to create new recipient email addresses at different times. In some embodiments, email delivery settings are specified for each of the recipient email addresses associated with the email user. In some embodiments, the email user configures the email delivery settings for each recipient email address to allow all senders or screen and challenge senders.

In some embodiments, the automated incoming email delivery filter system allows for different recipient addresses to handle incoming email from automated senders. In some embodiments, the automated incoming email delivery filter system comprises a command architecture that is configured to (i) review account settings and permissions associated with a plurality of recipient email addresses associated with a user and (ii) handle delivery of an incoming email that is addressed to a particular recipient email address in the plurality of recipient email addresses based on the account settings and permissions. In some embodiments, the account settings and permissions specify at least one of (i) unobstructed delivery of incoming email to a recipient email address in which the settings for the recipient email address are configured to allow delivery of email from all senders including automated senders, (ii) screened delivery of incoming email from an approved sender email address to a recipient email address in which the settings for the recipient email address include the sender email address in a list of approved senders (based on user configured approval, successful completion of a challenge, etc.), (iii) screened and challenge-pending delivery of incoming email from a non-approved sender email address to a recipient email address in which the list of approved senders in the settings for the recipient email address does not include the non-approved sender email address until the non-approved sender responds to and passes a challenge, and (iv) blocked delivery of the incoming email from the non-approved sender email address when the non-approved sender (a) does not respond to the challenge or (b) responds to but does not pass the challenge.

In some other embodiments, the multiple recipient email addresses are not user-configurable and the email user is not allowed to specify the email delivery settings for each recipient email address. In some embodiments, an automated process configures email delivery settings for each of the recipient email addresses. In some embodiments, the automated process comprises a software-implemented automated program of a host service provider in which the email user has an account. In some embodiments, the host service provider can implement a scheme to determine whether any given recipient email address created by the email user should have email delivery settings configured to allow automated senders or not. In some embodiments, the implemented scheme configures the email delivery settings for a recipient email address when the email user creates the recipient email address and the determination of whether the newly created recipient email address should receive emails from automated senders is made automatically by the host service provider based on one of several available email delivery setting scheme outlines. In some embodiments, instead of the email user creating the recipient email addresses, the host service provider automatically provides the multiple recipient email addresses to the email user. In some embodiments, the automatically provided multiple recipient email addresses are capped to a maximum number of recipient email addresses by the host service provider.

As stated above, email users receive messages from unwanted automated senders (spam). While there are systems to categorize emails based on recipient address as well as systems to screen senders with a challenge response before email is allowed through for delivery, there are no existing systems that implement both of these features in order to allow receipt of messages from humans and messages from only desired automated senders. Embodiments of the automated incoming email delivery filter system described in this specification solve such problems by offering an email user different email addresses to give to different senders that allow human originated email or automated email to pass through. In this way, the automated incoming email delivery filter system allows a user to easily receive email from both human and automated senders. Furthermore, the automated incoming email delivery filter system prevents delivery of mail from automated senders to an address that is specified to receive mail from humans by screening senders with a challenge response.

An example of an automated incoming email delivery filter system is described further below, by reference to FIG. 3. In addition to the automated incoming email delivery filter system, some embodiments provide automated incoming email delivery filter processes. Descriptions of such automated incoming email delivery filter processes are described next. In particular, the automated incoming email delivery filter processes of some embodiments comprise (i) an automated incoming email delivery filter account settings and permissions setup process (the so-called "setup and configuration process") and (ii) an automated incoming email delivery filter process for determining incoming email delivery handling according to user-configured account settings and permissions (the so-called "automated incoming email delivery filter runtime process").

Setup and Configuration Process

In some embodiments, the automated incoming email delivery filter account settings and permissions setup process comprises setting up an account, by a user, where the user is allowed to set up and configure multiple email addresses or the account of the user is automatically allocated a plurality of email addresses by a service provider. In some embodiments, the automated incoming email delivery filter account settings and permissions setup process also enables the user to (optionally) create groups of email addresses from various combinations of email addresses among the multiple email addresses configured by the user or allocated by the service provider. Furthermore, the automated incoming email delivery filter account settings and permissions setup process includes a step at which the user may indicate, for each individual email address or group of addresses, whether email from senders, including automated senders, should be delivered (without obstruction), screened for contingent pending delivery to the address or group, or blocked from delivery to the address or group. An example of an automated incoming email delivery filter account settings and permissions setup process is described further below, by reference to FIG. 1.

Automated Incoming Email Delivery Filter Runtime Process

In some embodiments, the automated incoming email delivery filter process for determining incoming email delivery handling according to user-configured account settings and permissions is a runtime process that occurs after the user has set up an account and is associated with multiple recipient addresses, where each recipient address either allows email from all senders or screens email from senders and challenges the senders, and thereafter allowing the email from senders who pass the challenge or blocking email from senders who fail the challenge. Thus, the automated incoming email delivery filter runtime process performs a plurality of steps comprising (i) receiving an incoming email addressed to a particular email address among the multiple email addresses configured by or allocated to the user, (ii) determining, upon receipt of the incoming email, whether the particular email address is configured to allow delivery of incoming email sent by automated senders, (iii) delivering the email to the user when the recipient address of the email is configured with settings to allow incoming email from automated senders, (iv) responding to the email with a challenge when the recipient address is configured to screen or block incoming email from automated senders, (v) awaiting a challenge response in the form of an action of the sender connected to the challenge or a reply email from the sender in response to the challenge (or any other means, not necessarily by email or action), (vi) determining whether the sender successfully completed the challenge response, and (vii) allowing the incoming email to proceed to the user when the sender has successfully completed the challenge response. An example of an automated incoming email delivery filter runtime process is described further below, by reference to FIG. 2.

Embodiments of the automated incoming email delivery filter system, the setup and configuration process, and the automated incoming email delivery filter runtime process described in this specification differ from and improve upon currently existing options. In particular, some embodiments differ from previous email systems in which users would have to choose between likely receiving email from unwanted automated senders or likely not receiving email from wanted automated senders. By contrast, the automated incoming email delivery filter system, the setup and configuration process, and the automated incoming email delivery filter runtime process of the present disclosure allow email users to receive email from humans and wanted automated senders while blocking email from unwanted automated senders.

In addition, the automated incoming email delivery filter system, the setup and configuration process, and the automated incoming email delivery filter runtime process of some embodiments improve upon existing systems, methods, processes, or other mechanisms (referred to as the "existing manner", the "existing mechanism", or the "existing approach") of using a recipient address to categorize incoming emails. Specifically, this existing manner of categorization does not prevent messages from unwanted automated senders. Also, the existing mechanism of screening senders with a challenge response will block messages from wanted automated senders. Any of the existing approaches to allow automated senders that uses the sender's address fail if the same sender uses a sender address previously not used. However, the automated incoming email delivery filter system, the setup and configuration process, and the automated incoming email delivery filter runtime process described in this specification overcome the deficiencies of the existing email filtering systems. Specifically, the automated incoming email delivery filter system, the setup and configuration process, and the automated incoming email delivery filter runtime process allow for different recipient addresses to either receive email from automated senders or screen senders with a challenge response, potentially blocking the delivery of the sender's email when failing the challenge. This allows an email user to use the same account to receive both messages from wanted automated senders and messages from human senders. In this way, the automated incoming email delivery filter system allows for scenarios in which a desired automated sender uses multiple "From" addresses or changes their "From" address unexpectedly, but still being able to accept their messages as the user wishes.

The automated incoming email delivery filter system of the present disclosure may be comprised of a software implementation of either or both of the setup and configuration process and the automated incoming email delivery filter runtime process. Together, several possible steps, operations, or actions are defined for the setup and configuration process and the automated incoming email delivery filter runtime process. This list of possible constituent steps is intended to be exemplary only and it is not intended that this list be used to limit the automated incoming email delivery filter system, the setup and configuration process, and/or the automated incoming email delivery filter runtime process of the present application to just these steps. Persons having ordinary skill in the art relevant to the present disclosure may understand there to be equivalent steps that may be substituted within the present disclosure without changing the essential function or operation of the automated incoming email delivery filter system, the setup and configuration process, and/or the automated incoming email delivery filter runtime process.

1. Allow a user to have multiple recipient addresses and allow the user to indicate (or rather, configure settings that specify) whether the user would like to block automated senders or not.
2. Then, upon receipt of an email addressed to a particular recipient address associated with the user, check the configuration settings associated with the particular recipient address to see whether to allow all senders or screen and challenge senders, blocking email delivery when the challenge is not successfully responded to by the sender in response to the challenge.
3. If the sender passes the challenge (which may be to respond to a 'challenge email' or perform another action like open an image, describe a color shown in the email, input for a captcha, sending to a different email address, visiting a link in their browser, or another kind of challenge), then deliver the sender's message(s) to the user.
4. Upon receipt of an email for a user, if the message is addressed to a user's address that they have not indicated to block automated senders, deliver the message to the user.

The user will first set up some amount of recipient addresses to block automated senders. When an email for that user is received, the automated incoming email delivery filter system will check whether the address the message is addressed to is one of the addresses the user has indicated should block automated senders. If it is, the automated incoming email delivery filter system will respond to the sender with a challenge, in order to determine whether the sender is automated. If the sender fails the challenge, suggesting that it is an automated sender, the message will not be delivered. If the sender passes the challenge, or the message is sent to an address the user has not indicated should block automated senders, the message is delivered to the user.

The automated incoming email delivery filter system, the setup and configuration process, and the automated incoming email delivery filter runtime process of the present disclosure generally work by allowing users to receive messages from both human senders and automated senders, while blocking messages from unwanted automated senders.

The automated incoming email delivery filter system does this by allowing a user to have multiple addresses for which they receive email. Each address can also be set to block receipt of messages from automated senders. When the user provides their address to a sender or to the public, if they want to receive messages from only humans, they can provide an address they have configured to screen senders. If they want to receive messages from automated senders, they can provide an address they have not configured to screen senders. When the automated incoming email delivery filter system receives email for the user, it will check whether the recipient address has been configured to block automated senders. If so, the automated incoming email delivery filter system can check whether the sender has passed a challenge, and if they have not, the message is not delivered, and a response message containing a challenge is sent back to the sender. If the sender then passes the challenge, the message is delivered to the user. If the recipient address has not been configured to block automated senders, the message is delivered to the user immediately.

Also, when an email is received for a user, if the message is addressed to an address the user has not indicated should block automated senders, then the message is immediately delivered. If the message is addressed to an address the user has indicated should block automated senders, then the message is not delivered, and a response with a challenge is sent to the sender of the message. If the sender passes the challenge, then the message is delivered. An example of how this works is described below, by reference to FIG. 1.

Specifically, FIG. 1 conceptually illustrates an automated incoming email delivery filter account settings and permissions setup process 100. As shown in this figure, the automated incoming email delivery filter account settings and permissions setup process 100 involves several operations (or steps). In particular, the automated incoming email delivery filter account settings and permissions setup process 100 starts when a user sets up an account (at 110). For instance, a service provider may implement and deploy the automated incoming email delivery filter system as a network accessible cloud application service available to a new user who connects to the cloud service by way of a computing device and, upon accessing the service, is prompted to create an account. Although the automated incoming email delivery filter account settings and permissions setup process 100 shown in this figure illustrates this first step of setting up an account (at 110) as a starting point for continuing forward through the remaining steps (at 120-140), it is noted that existing users who have previously set up an account, may instead be prompted to enter user credentials (such as username/password) in order to access account details and carry out other operations for configuring their account, adding or changing email addresses, adding or changing groups of email addresses, adding or changing email delivery settings, approving sender email addresses, removing sender email addresses from a list of approved senders, etc.

In some embodiments, the automated incoming email delivery filter account settings and permissions setup process 100 allows the user to set up and configure multiple recipient email addresses (at 120). In some embodiments, instead of allowing the user to set up and configure the multiple recipient addresses, the user is allocated a plurality of recipient addresses automatically by a service provider who implements/deploys the automated incoming email delivery filter system, such as a cloud application service providing business ("service provider").

Whether the plurality of recipient email addresses are automatically allocated by a service provider or the user has set up and configured multiple recipient email addresses, the automated incoming email delivery filter account settings and permissions setup process 100 of some embodiments proceeds to the next step, which is an optional step at which the user may create groups of recipient email addresses. In some embodiments, the user may select two or more of the recipient addresses among the user configured multiple email addresses or the service provider allocated plurality of recipient email addresses (including those which, if any, were previously created and linked to the user's account) to group together to form a recipient group of addresses (at 130).

Next, the automated incoming email delivery filter account settings and permissions setup process 100 proceeds to a final setup and configuration step during which the user may indicate, for each individual email address or recipient group of addresses, whether to allow delivery of incoming email from automated senders or not (at 140). While this step is described as a final step of the automated incoming email delivery filter account settings and permissions setup process 100, it is possible for the user to return back to the automated incoming email delivery filter account settings and permissions setup process 100 to possibly add additional recipient addresses to those already created or change/update delivery handling settings in connection with each or all of the plurality of recipient email addresses.

To make the automated incoming email delivery filter system of the present disclosure, one would craft software that can complete the requisite tasks and steps of the automated incoming email delivery filter account settings and permissions setup process 100 and the automated incoming email delivery filter process, with the requisite logic functions and user interface aspects which allow users to indicate the various configuration settings and recipient email options.

Furthermore, the automated incoming email delivery filter system of some embodiments can be expanded to add a feature that gives users an address scheme so that all addresses matching that scheme are delivered to the corresponding user. This could essentially give the user unlimited addresses to use as recipient addresses, and they would not need to be configured before use. The option of indicating that a recipient address should block automated senders does not need to be off by default. All addresses and address schemes for a user could block automated senders by default, meaning a user would need to indicate whether a recipient address should allow automated senders, and the software would perform the same function. The user could also configure this option on a recipient address scheme basis instead of a recipient address basis as well, and the software would perform the same function. It is also not necessary to deny emails during the SMTP transaction sent by an automated system to an address indicated to block automated senders. The automated incoming email delivery filter system can deliver these messages to a portion of the user's account designated for such messages, such as a "screening" area.

To use the automated incoming email delivery filter system of the present disclosure, the user indicates that an address or addresses should block automated senders. The user gives this address or these addresses to senders that the user reasonably believes would be human. If an automated sender that is unable to pass the challenge attempts to send messages to these addresses, their messages will not be delivered. The user gives a different address or different addresses that they have not indicated to block automated senders to senders that the user reasonably believes would be automated, from which they would like to receive messages. For example, if the user expects to receive account related emails for a service, they use one of these addresses for the service and the account related emails would be delivered, even if they are sent by an automated system. By allowing a user to give different addresses to different senders with the indicated options and the logic and functions provided by the system, the user is able to receive emails from only the desired senders, both human and automated.

Figure 2:
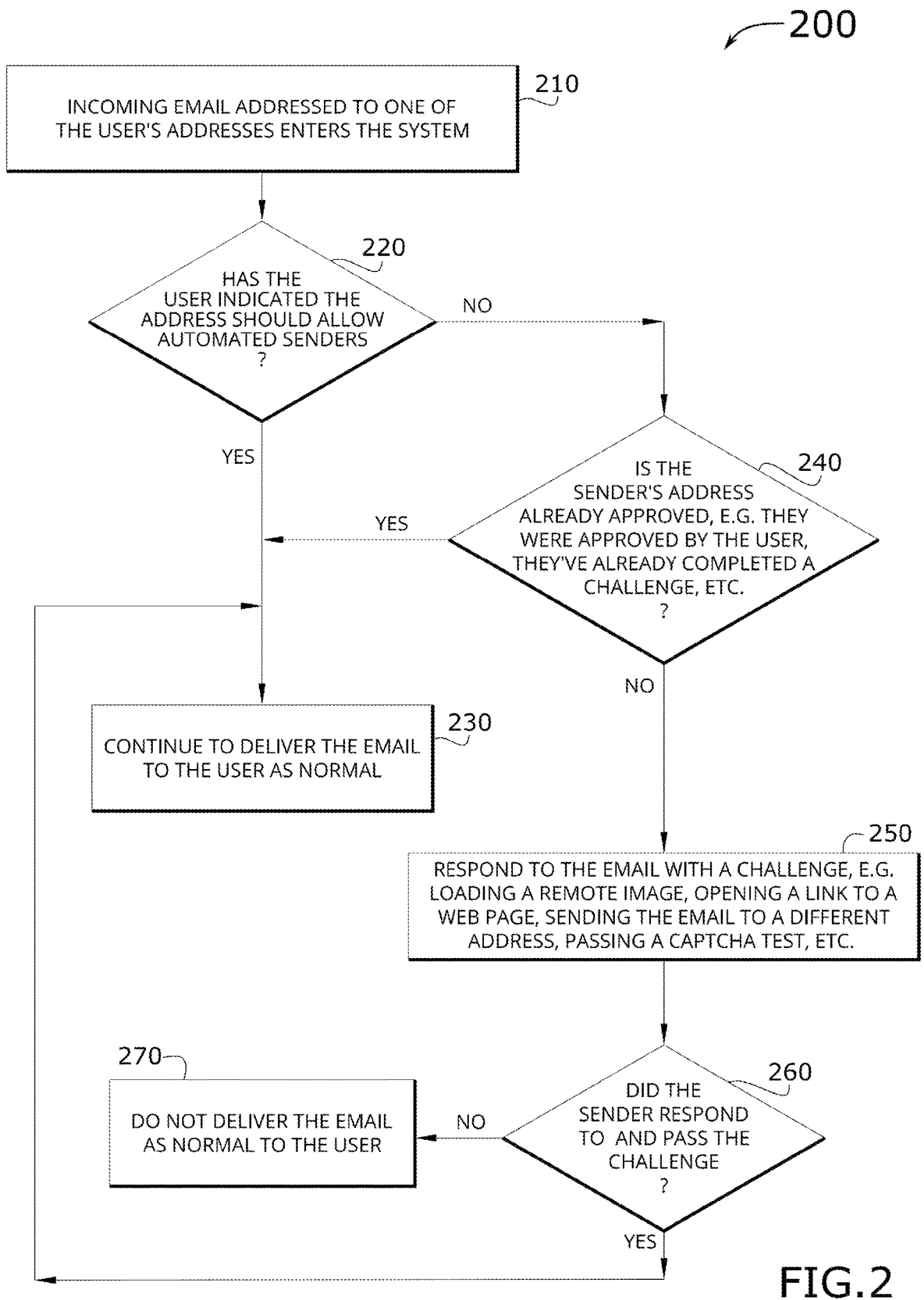
FIG. 2 conceptually illustrates an automated incoming email delivery filter process for determining incoming email delivery handling according to user-configured account settings and permissions in some embodiments.

By way of example, FIG. 2 conceptually illustrates an automated incoming email delivery filter process 200 for determining incoming email delivery handling according to user-configured account settings and permissions in some embodiments. The automated incoming email delivery filter process 200 of some embodiments is a runtime process performed by a software implementation running on a server of the automated incoming email delivery filter system (and, thus, referred to as the "automated incoming email delivery filter runtime process").

As shown in this figure, the automated incoming email delivery filter runtime process 200 starts when an incoming email, which is addressed to one of the multiple addresses associated with a user, is received (at 210). As described above, by reference to FIG. 1, the user may configure, set, or otherwise specify automated sender email delivery settings (referred to simply as "settings") for each email address among the multiple email addresses associated with the user. Furthermore, the automated incoming email delivery filter runtime process 200 is performed each time an incoming email message is addressed to any of the multiple email addresses associated with the user. For instance, the automated incoming email delivery filter runtime process 200 may be implemented as a multi-threaded software service hosted by the automated incoming email delivery filter system when running on a server (also referred to as the "automated incoming email delivery filter server") with a multi-core processor configured to concurrently receive and process multiple incoming email messages. With respect to the automated incoming email delivery filter runtime process 200, concurrently receiving and processing multiple incoming email messages involves performing the operations associated with the steps of the automated incoming email delivery filter runtime process 200, but doing so separately for each incoming email and concurrently with other instances of the software-implemented automated incoming email delivery filter runtime process 200 for other incoming emails.

After such an incoming email is received (at 210), the automated incoming email delivery filter runtime process 200 proceeds to a step for determining (at 220) whether the settings associated with the email address to which the email is addressed (referred to as the "recipient email address" or the "particular recipient email address") allow for unobstructed delivery of email from automated senders.

When the settings configured for the recipient email address indicate that incoming email from automated senders is allowed ('YES'), the automated incoming email delivery filter runtime process 200 proceeds to the next step of delivering the received email to the user as normal (at 230). Specifically, delivering the received email to the user as normal means to deliver the email to the user at the particular recipient email address without any further delivery processing, obstruction, or screening by the automated incoming email delivery filter system. After delivery of the email to the user at the particular recipient email address, the automated incoming email delivery filter runtime process 200 ends (with respect to this particular received email).

On the other hand, other processing ensues when the automated incoming email delivery filter runtime process 200 determines (at 220) that the settings configured for the particular recipient email address do not indicate that incoming email from automated senders is allowed ('NO'). In that case, the automated incoming email delivery filter runtime process 200 transitions to a step for determining (at 240) whether the email address of the sender is an approved email address. Specifically, an email address of a sender (also referred to as the "sender address") may be an approved email address when the sender address is present in a list of approved addresses (also referred to as the "approved sender list").

When the sender address is determined (at 240) to be present in the approved sender list ('YES'), the automated incoming email delivery filter runtime process 200 proceeds to delivering the received email to the user as normal (at 230). On the other hand, when the sender address is not present in the approved sender list, then the sender address is not determined (at 240) to be approved ('NO'), in which case the automated incoming email delivery filter runtime process 200 moves forward to a challenge phase.

Specifically, the challenge phase occurs when the automated incoming email delivery filter runtime process 200 performs a step for responding to the sender email with a challenge (at 250). For example, the challenge may require the sender to load a remote image, open a link to a web page, resend the incoming email to a different address associated with the user, passing a captcha test, etc. The automated incoming email delivery filter runtime process 200 waits for the challenge response to arrive. In some embodiments, the automated incoming email delivery filter runtime process 200 determines (at 260) whether the sender responds to and passes the challenge. Then, based on the determination (at 260), the automated incoming email delivery filter runtime process 200 either continues to deliver the incoming email to the user as normal (at 230) when the sender has affirmatively responded to and passed the challenge ('YES') or does not deliver the incoming email as normal to the user (at 270) when the sender has not responded to and/or passed the challenge ('NO'). Then the automated incoming email delivery filter runtime process 200 ends.

Figure 3:
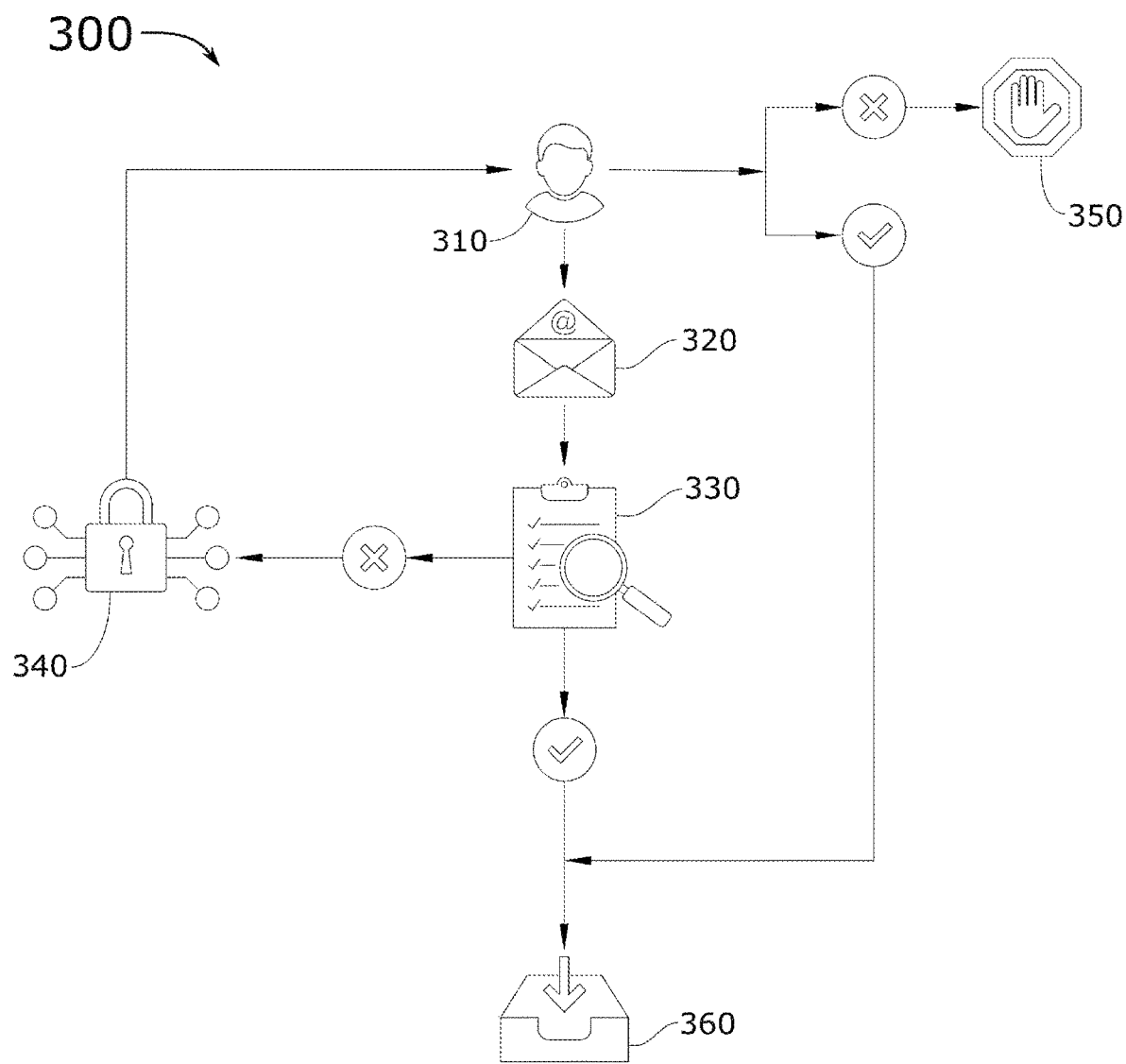
FIG. 3 conceptually illustrates a schematic view of a command architecture of a schematic view of an automated incoming email delivery filter system in some embodiments.

Turning now to another example, FIG. 3 conceptually illustrates a schematic view of a command architecture of an automated incoming email delivery filter system 300. As shown in this figure, the command architecture of the automated incoming email delivery filter system 300 includes a sender 310, an incoming email 320 sent by the sender 310, an approved sender list 330, a security challenge 340, a sender email block repository 350, and a recipient inbox 360.

The sender 310 may be a human sender, an automated bot sender, an automated system configured to automatically generate and send email, etc. The incoming email 320 is the email message received by the automated incoming email delivery filter system 300. When so received, the automated incoming email delivery filter system 300 screens the header data of the incoming email to retrieve the sender address. While the contents of the incoming email may be encrypted, the header information with the sender address is typically not encrypted. When or if the sender address is encrypted or undecipherable, the automated incoming email delivery filter system 300 of some embodiments places the incoming encrypted email in a repository storing blocked emails-in particular, the sender email block repository 350. However, when the sender email address is retrievable, the automated incoming email delivery filter system 300 reads the sender address and performs a search for the sender address in the approved sender list 330. When the sender address is affirmatively present in the approved sender list 330, then the automated incoming email delivery filter system 300 proceeds to deliver the incoming email 320 to the recipient inbox 360 as normal. Notably, the sender address may be present in the approved sender list 330 as a result of several actions, such as when the user has configured the recipient email address to allow automated senders, when the user has proactively approved the sender address for addition to the approved sender list 330, or when an implied approval is triggered by the sender successfully responding to a prior challenge in connection with a prior incoming email, etc.

On the other hand, when the sender address is not found in the search of the approved sender list 330, then the automated incoming email delivery filter system 300 proceeds to sending a challenge 340 in a response email delivered to the sender 310 at the sender address. If the sender responds to the challenge in a successful way (passes the challenge), then the automated incoming email delivery filter system 300 adds the sender address to the approved sender list 330 and automatically proceeds to deliver the incoming email 320 to the recipient inbox 360. However, if the sender fails to pass the challenge, the automated incoming email delivery filter system 300 sends the incoming email 320 to the sender email block repository 350. In some embodiments, the automated incoming email delivery filter system 300 also adds the sender address to a blocked sender list. In some embodiments, the sender may fail to pass the challenge by inaction after an amount of time. For example, the challenge response email may allow the sender to respond to the challenge for only a limited amount of time and, if the amount of time expires or lapses, a successful challenge response from the sender thereafter is simply discarded as untimely, leaving the challenge unresolved or not passed by the sender.

Additionally, the automated incoming email delivery filter system can be adapted for use by or integrated into any system that allows messages to be sent from and to different recipient addresses. A computer messaging system other than email could implement the functionality of the automated incoming email delivery filter system. A physical message delivery service could also implement the functionality of the automated incoming email delivery filter system.

In this specification, the term "software" is meant to include firmware residing in read-only memory or applications stored in storage, which can be read into memory for processing by a processor. Also, in some embodiments, multiple software inventions can be implemented as subparts of a larger program while remaining distinct software inventions. In some embodiments, multiple software inventions can also be implemented as separate programs. Finally, any combination of separate programs that together implement a software invention described here is within the scope of the invention. Also, the software programs, when installed to operate on one or more electronic systems, define one or more specific machine implementations that execute and perform the operations of the software programs.

Figure 4:
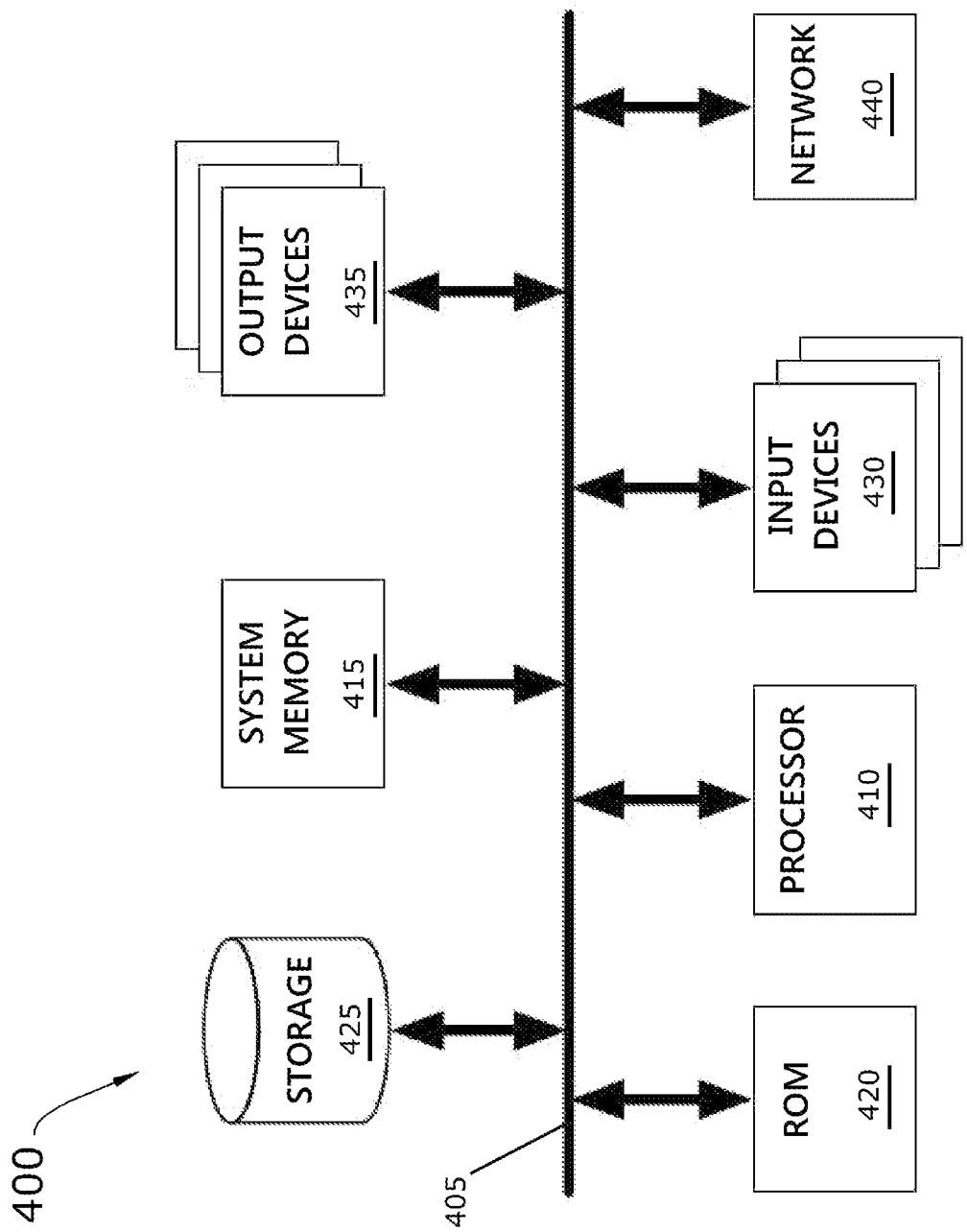
FIG. 4 conceptually illustrates an electronic system with which some embodiments of the invention are implemented.

By way of example, FIG. 4 conceptually illustrates an electronic system 400 with which some embodiments of the invention are implemented. The electronic system 400 may be a conventional computing device (e.g., a desktop personal computer, laptop, etc.), a server computing device, or a mobile device (e.g., a smartphone, a tablet computing device, etc). Such an electronic system includes various types of computer readable media and interfaces for various other types of computer readable media. As shown in this figure, the electronic system 400 includes a bus 405, processing unit(s) 410, a system memory 415, a read-only memory 420, a permanent storage device 425, input devices 430, output devices 435, and a network 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425.

From these various memory units, the processing unit(s) 410 retrieves instructions to execute and data to process in order to execute the processes of the invention. The processing unit(s) may be a single processor or a multi-core processor in different embodiments.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 425.

Other embodiments use a removable storage device (such as a floppy disk or a flash drive) as the permanent storage device 425. Like the permanent storage device 425, the system memory 415 is a read-and-write memory device. However, unlike storage device 425, the system memory 415 is a volatile read-and-write memory, such as a random access memory. The system memory 415 stores some of the instructions and data that the processor needs at runtime. In some embodiments, the invention's processes are stored in the system memory 415, the permanent storage device 425, and/or the read-only memory 420. For example, the various memory units may include instructions for scanning a sender email address in header data of an incoming email message addressed to a recipient email address, followed by instructions for determining whether to deliver the incoming email message to an inbox associated with the recipient email address, screen and challenge the sender before delivering the incoming email message to the inbox, or block the incoming email message from being delivered to the inbox (and perhaps delivering the incoming email message to a location for blocked automated senders, such as the automated sender email block repository 350 described above, by reference to FIG. 3) or otherwise in accordance with embodiments of the invention described in this specification. From these various memory units, the processing unit(s) 410 retrieves instructions to execute and data to process in order to execute the processes of some embodiments.

The bus 405 also connects to the input and output devices 430 and 435. The input devices enable the user to communicate information and select commands to the electronic system. The input devices 430 include alphanumeric keyboards and pointing devices (also called "cursor control devices"). The output devices 435 display the contents of email messages generated upon user selection after permitting delivery to the inbox of the user by the electronic system 400. The output devices 435 include display devices, such as liquid crystal displays (LCD) and organic light emitting diode (OLED) displays. The output devices 435 may also include printers. Some embodiments include devices such as a touchscreen that functions as both input and output devices.

Finally, as shown in FIG. 4, bus 405 also couples electronic system 400 to a network 440 through a network adapter (not shown). In this manner, the computer can be a part of a network of computers (such as a local area network ("LAN"), a wide area network ("WAN"), or an intranet), or a network of networks (such as the Internet). Any or all components of electronic system 400 may be used in conjunction with the invention.

These functions described above can be implemented in digital electronic circuitry, in computer software, firmware or hardware. The techniques can be implemented using one or more computer program products. Programmable processors and computers can be packaged or included in conventional computing devices and/or mobile devices. The processes may be performed by one or more programmable processors and by one or more set of programmable logic circuitry. General and special purpose computing and storage devices can be interconnected through communication networks.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A non-transitory computer readable medium storing an automated incoming email delivery filter runtime program which, when executed by a processor of a computing device, screens and filters incoming email for delivery handling of the incoming email to one of several recipient email addresses, said automated incoming email delivery filter runtime program comprising sets of instructions for:

receiving, by an email processing cloud application service hosted on a bare metal automated incoming email delivery filter server and from an email service utilized by a sender, an incoming email addressed to a recipient email address associated with a recipient user, wherein the recipient email address is one of a plurality of recipient email addresses configured for email management by the recipient user, wherein delivery of the incoming email to an inbox accessible to the recipient user is prevented unless delivery settings associated with the recipient email address permit delivery to the inbox;

screening, by the email processing cloud application service, header data of the incoming email;

determining, while screening the header data by the email processing cloud application service, whether the header data of the incoming email is encrypted;

placing the incoming email in a sender email block repository when the header data of the incoming email is encrypted;

retrieving a sender email address from the header data of the incoming email when the header data of the incoming email is not encrypted;

identifying, by the email processing cloud application service when the header data of the incoming email is not encrypted, a type of sender based on the sender email address of the incoming email addressed to the recipient email address, wherein the type of sender comprises one of a known and allowed sender, a known automated sender, and an unknown sender;

delivering, when the header data of the incoming email is not encrypted, the incoming email to the inbox for viewing by the recipient user when the identified type of sender is the known and allowed sender;

determining, when the identified type of sender is not the known and allowed sender and the header data of the incoming email is not encrypted, whether delivery settings for the recipient email address are configured to allow automated senders;

delivering the incoming email, when the header data of the incoming email is not encrypted, to the inbox for viewing by the recipient user when the delivery settings for the recipient email address are configured to allow automated senders;

blocking the incoming email, when the identified type of sender is the known automated sender and the header data of the incoming email is not encrypted, from delivery to the inbox when the delivery settings for the recipient email address are not configured to allow automated senders;

temporarily blocking and holding up the incoming email, when the identified type of sender is the unknown sender and the header data of the incoming email is not encrypted, from immediate delivery to the inbox when the delivery settings for the recipient email address are not configured to allow automated senders;

automatically sending, by the email processing cloud application service when the header data of the incoming email is not encrypted and when the incoming email is temporarily blocked and held up from immediate delivery to the inbox, a response email to the sender email address of the unknown sender, wherein the response email comprises a challenge generated by a challenge system running as a service in connection with the email processing cloud application service;

awaiting, by the email processing cloud application service when the header data of the incoming email is not encrypted, an incoming reply email from the sender email address of the unknown sender;

determining, by the email processing cloud application service when the header data of the incoming email is not encrypted, whether the incoming reply email from the sender email address of the unknown sender is received;

identifying, when the incoming reply email from the sender email address of the unknown sender is received by the email processing cloud application service and the header data of the incoming email is not encrypted, a sender challenge response comprising one of an action of a human sender of the sender email address evidenced in the incoming reply email and information provided by the human sender of the sender email address in the incoming reply email;

determining, by the challenge system when the header data of the incoming email is not encrypted, whether the identified sender challenge response successfully passes the challenge of the response email automatically sent to the sender email address of the unknown sender;

delivering, by the email processing cloud application service when the header data of the incoming email is not encrypted, the incoming email to the inbox when the identified sender challenge response successfully passes the challenge; and preventing, by the email processing cloud application service when the header data of the incoming email is not encrypted, delivery of the incoming email to the inbox when the identified sender challenge response fails the challenge.

2. The non-transitory computer readable medium of claim 1, wherein the set of instructions for automatically sending the response email with the challenge to the sender email address of the unknown sender comprises a set of instructions for using the challenge system by the email processing cloud application service to respond to the incoming email with the challenge when the recipient email address specified in the incoming email is associated with delivery settings configured to block automated senders.

3. The non-transitory computer readable medium of claim 2 further comprising a set of instructions for timing out when a time for awaiting the incoming reply email from the sender email address of the unknown sender exceeds a threshold time for receiving a response from the sender email address of the unknown sender.

4. The non-transitory computer readable medium of claim 3 further comprising a set of instructions for preventing, by the email processing cloud application service, delivery of the incoming email to the inbox when the time for awaiting the incoming reply email from the sender email address of the unknown sender exceeds the threshold time for receiving the response from the sender email address of the unknown sender.

5. The non-transitory computer readable medium of claim 1, wherein the sender challenge response comprises the action of the human sender evidenced in the incoming reply email by the sender email address to pass the challenge.

6. The non-transitory computer readable medium of claim 1, wherein the sender challenge response comprises information provided by the human sender evidenced in the incoming reply email by the sender email address and an action evidenced by selection of a link in the response email to successfully pass the challenge.

7. The non-transitory computer readable medium of claim 6 further comprising a set of instructions for adding the sender email address to an approved list of automated sender addresses when the unknown sender is demonstrated to be the human sender.

8. The non-transitory computer readable medium of claim 7 wherein the approved list of automated sender addresses is associated only with the recipient email address, wherein each of the multiple recipient email addresses for the user is associated with its own approved sender list.

* * * * *